US011679755B2

(12) United States Patent
Ikeda et al.

(10) Patent No.: US 11,679,755 B2
(45) Date of Patent: Jun. 20, 2023

(54) CONTROL DEVICE FOR HYBRID VEHICLE

(71) Applicant: TOYOTA JIDOSHA KABUSHIKI KAISHA, Aichi-ken (JP)

(72) Inventors: Yuto Ikeda, Okazaki (JP); Yuki Nose, Nagoya (JP); Takanobu Gotoh, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 51 days.

(21) Appl. No.: 17/551,190

(22) Filed: Dec. 15, 2021

(65) Prior Publication Data

US 2022/0242393 A1 Aug. 4, 2022

(30) Foreign Application Priority Data

Jan. 29, 2021 (JP) .............................. JP2021-012691

(51) Int. Cl.
| | |
|---|---|
| *B60W 20/16* | (2016.01) |
| *B60W 10/06* | (2006.01) |
| *B60W 10/08* | (2006.01) |
| *F01N 3/023* | (2006.01) |
| *B60W 30/192* | (2012.01) |
| *B60W 10/11* | (2012.01) |

(52) U.S. Cl.
CPC ............ *B60W 20/16* (2016.01); *B60W 10/06* (2013.01); *B60W 10/08* (2013.01); *B60W 10/11* (2013.01); *B60W 30/192* (2013.01); *F01N 3/023* (2013.01); *B60W 2510/068* (2013.01); *B60W 2510/1005* (2013.01); *B60W 2510/30* (2013.01)

(58) Field of Classification Search
CPC ...... B60W 20/16; B60W 20/10; B60W 20/15; B60W 10/06; B60W 10/18; B60W 10/11; B60W 30/192; B60W 30/19; B60W 30/20; B60W 2510/068; B60W 2510/1005; B60W 2510/30; B60W 2710/083; B60W 2030/206; F01N 3/023; F01N 2430/02; F02D 35/027; F02D 2200/1002; F02D 2250/12; F02D 2250/18
See application file for complete search history.

(56) References Cited

U.S. PATENT DOCUMENTS

| | | | | |
|---|---|---|---|---|
| 2011/0264342 | A1* | 10/2011 | Baur | F02D 41/023 |
| | | | | 701/54 |
| 2016/0215705 | A1* | 7/2016 | Haizaki | F02D 41/0002 |
| 2018/0056981 | A1* | 3/2018 | Cho | B60W 10/06 |
| 2020/0277908 | A1* | 9/2020 | Glugla | F16H 61/0213 |

FOREIGN PATENT DOCUMENTS

JP 2009248698 A 10/2009

\* cited by examiner

*Primary Examiner* — George C Jin
(74) *Attorney, Agent, or Firm* — Hauptman Ham, LLP (57) ABSTRACT

A control device is capable of executing: an ignition time calculation process of calculating a target ignition time of an ignition plug; a stop process of stopping combustion control for some cylinders of a plurality of cylinders; and a compensation process of controlling a motor generator during the stop process, such that the motor generator compensates a drive power that is lost due to the stop of the combustion control. The control device prohibits the execution of the stop process when the target ignition time calculated in the ignition time calculation process is on a retard side of a predetermined prescribed time.

6 Claims, 4 Drawing Sheets

CONTROL DEVICE FOR HYBRID VEHICLE

CROSS-REFERENCE TO RELATED APPLICATION

This application claims priority to Japanese Patent Application No. 2021-012691 filed on Jan. 29, 2021, incorporated herein by reference in its entirety.

BACKGROUND

1. Technical Field

The present disclosure relates to a control device for a hybrid vehicle.

2. Description of Related Art

A vehicle disclosed in Japanese Unexamined Patent Application Publication No. 2009-248698 (JP 2009-248698 A) includes an internal combustion engine, a first motor generator, a second motor generator, a planetary gear mechanism, a drive shaft, drive wheels, and a control device. The internal combustion engine, the first motor generator, and the second motor generator are joined through the planetary gear mechanism, so as to be capable of transmitting dynamic power to each other. The planetary gear mechanism is joined to the drive wheels through the drive shaft. The planetary gear mechanism transmits torques output by the internal combustion engine, the first motor generator, and the second motor generator, to the drive wheels through the drive shaft.

The control device controls the internal combustion engine and the motor generators. The control device stops combustion of air-fuel mixture in each cylinder of the internal combustion engine, depending on traveling situation of the vehicle. On that occasion, for restraining a torque shock that is generated in the drive shaft due to a decrease in the torque of the internal combustion engine, the control device causes the second motor generator to output a correction torque. That is, the control device drives and controls the second motor generator, for making up a decrease amount of the torque of the internal combustion engine.

SUMMARY

In the control of the internal combustion engine, in the case where the combustion of the air-fuel mixture is performed in all of the cylinders of the internal combustion engine in sequence, the torque of the internal combustion engine periodically increases in response to combustion strokes of the cylinders. In the control of the internal combustion engine, in some cases, only in some cylinders of the cylinders of the internal combustion engine, the combustion of the air-fuel mixture is stopped, and in the other cylinders, the combustion of the air-fuel mixture at the corresponding ignition times is continued. In this case, the torque of the internal combustion engine increases in response to combustion strokes of the cylinders in which the combustion is continued. On the other hand, the torque of the internal combustion engine considerably decreases at times of combustion strokes of the cylinders in which the combustion is stopped.

In the case where the internal combustion engine is controlled while the combustion in some cylinders is stopped as described above, the technology in JP 2009-248698 A can be applied and the correction torque can be output. In this case, for cancelling out the decrease in the torque of the internal combustion engine, the correction torque is output at times of combustion strokes of the cylinder in which the combustion stopped. When the ignition time of the cylinder in which the combustion is continued suddenly changes to the retard side in a state where the output of the correction torque is repeated, the phase of the torque of the internal combustion engine suddenly changes as a whole. Concomitantly with this, the timing of the peak of the decrease amount of the torque of the internal combustion engine suddenly changes at the time of the combustion stroke of the cylinder in which the combustion is stopped. In this case, a gap is generated between the phase of the torque of the internal combustion engine and the phase of the correction torque, so that it is not possible to appropriately cancel out the decrease in the torque of the internal combustion engine.

A control device for a hybrid vehicle for solving the above problem is a control device for a hybrid vehicle, the hybrid vehicle including an internal combustion engine and a motor generator as drive sources, the internal combustion engine including a plurality of cylinders and an ignition plug for each of the cylinders, the internal combustion engine and the motor generator being joined to a drive shaft, the control device being capable of executing: an ignition time calculation process of calculating a target ignition time of the ignition plug; a stop process of stopping combustion control for some cylinders of the cylinders; and a compensation process of controlling the motor generator during the stop process, such that the motor generator compensates a drive power that is lost due to the stop of the combustion control, the control device prohibiting the execution of the stop process when the target ignition time calculated in the ignition time calculation process is later than a predetermined prescribed time.

In the above configuration, when the target ignition time is later than the prescribed time, the execution of the stop process is prohibited. That is, when there is a risk that it is not possible to compensate the change in the torque of the internal combustion engine due to the stop process, the stop process is not executed. Accordingly, it is possible to prevent the generation of vibration or the like that is caused by the failure of the compensation of the torque change during the stop process.

The control device for the hybrid vehicle may regard the target ignition time as being later than the prescribed time and may prohibit the execution of the stop process, when the torque of the internal combustion engine is equal to or lower than a predetermined prescribed torque during deceleration of the hybrid vehicle.

When the torque of the internal combustion engine becomes equal to or lower than the prescribed torque during the deceleration of the hybrid vehicle, the target ignition time is delayed for further decreasing the torque of the internal combustion engine. That is, when the torque of the internal combustion engine becomes equal to or lower than the prescribed torque during the deceleration, there is a probability that the target ignition time becomes later than the prescribed time. By prohibiting the execution of the stop process under such a situation, it is possible to prevent, in advance, the generation of the vibration or the like that is caused by the failure of the compensation of the torque change.

In the control device for the hybrid vehicle, the internal combustion engine may include a filter that traps particulate matter in exhaust gas, the control device may be capable of executing a filter regeneration process of removing the particulate matter trapped in the filter, when a condition including a condition that an accumulation amount of the particulate matter in the filter is equal to or larger than a predetermined prescribed accumulation amount is met, and the control device may regard the target ignition time as being later than the prescribed time and may prohibit the execution of the stop process, during the execution of the filter regeneration process.

During the execution of the filter regeneration process, the target ignition time is delayed for raising the temperature of the filter. That is, during the execution of the filter regeneration process, there is a probability that the target ignition time becomes later than the prescribed time. By prohibiting the execution of the stop process under such a situation, it is possible to prevent, in advance, the generation of the vibration or the like that is caused by the failure of the compensation of the torque change.

The control device for the hybrid vehicle may be capable of executing a knocking determination process of determining whether knocking has occurred in the internal combustion engine, and the control device may regard the target ignition time as being later than the prescribed time and may prohibit the execution of the stop process, when a period during which it is continuously determined that the knocking has occurred in the knocking determination process is equal to or longer than a predetermined prescribed period.

When the knocking is continued, the target ignition time is delayed for restraining the knocking. That is, when the knocking is continued, there is a probability that the target ignition time becomes later than the prescribed time. By prohibiting the execution of the stop process under such a situation, it is possible to prevent, in advance, the generation of the vibration or the like that is caused by the failure of the compensation of the torque change.

The control device for the hybrid vehicle may regard the target ignition time as being later than the prescribed time and may prohibit the execution of the stop process, when a speed change gear is switching a gear stage, the speed change gear being joined to the internal combustion engine and having a plurality of gear stages.

When the speed change gear is switching the gear stage, the target ignition time is delayed for reducing a speed change shock due to the switching of the gear stage. That is, when the speed change gear is switching the gear stage, there is a probability that the target ignition time becomes later than the prescribed time. By prohibiting the execution of the stop process under such a situation, it is possible to prevent, in advance, the generation of the vibration or the like that is caused by the failure of the compensation of the torque change.

The control device for the hybrid vehicle may continue to prohibit the stop process until a predetermined fixed period elapses after the control device starts to prohibit the execution of the stop process, regardless of the target ignition time.

The above configuration makes it possible to avoid the repeat of the execution and interruption of the stop process in a short period.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of a control device for a hybrid vehicle will be described below with reference to the drawings.

Schematic Configuration of Vehicle

Figure 1:
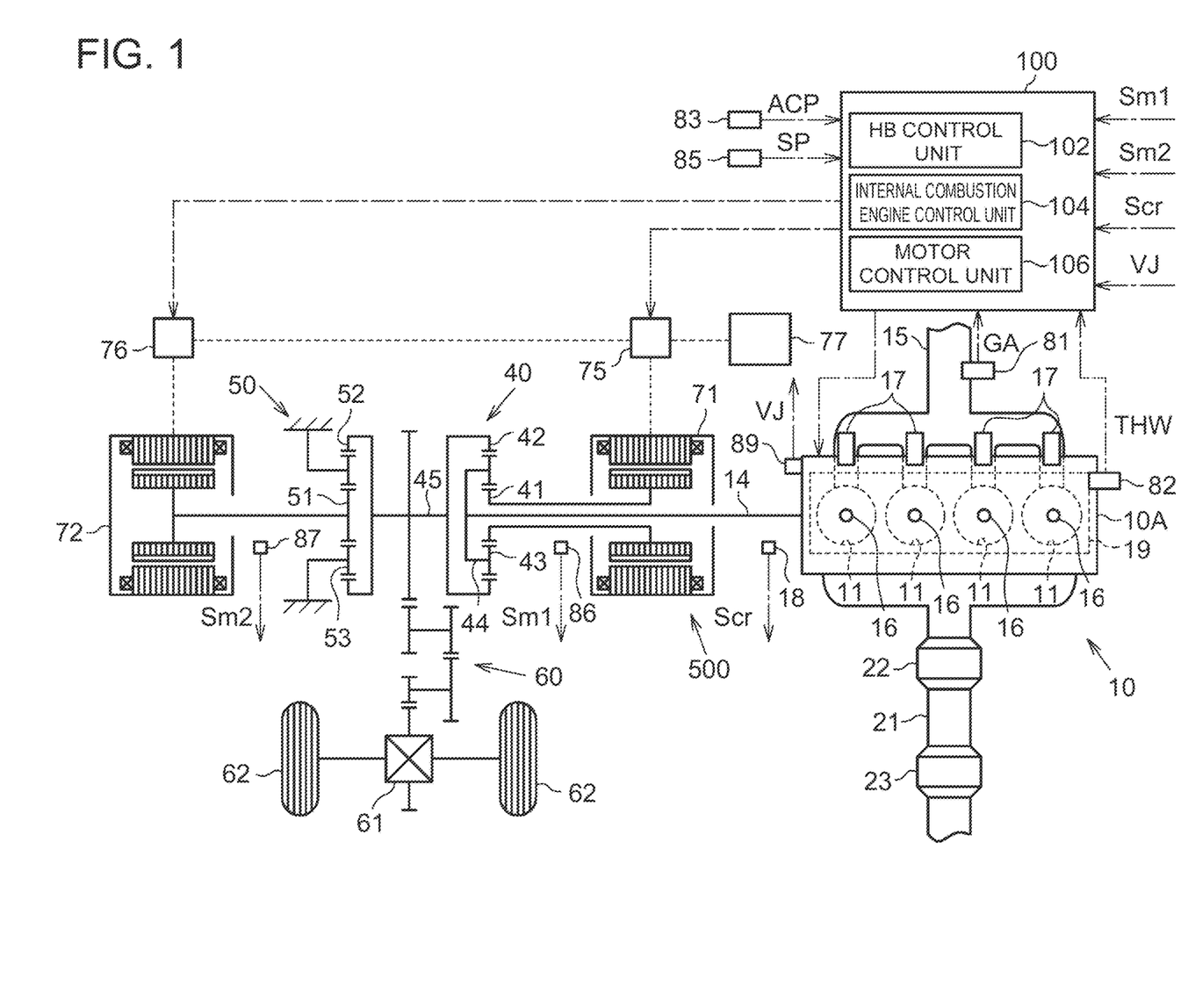
FIG. 1 is a schematic configuration diagram of a vehicle.

As shown in FIG. 1, a hybrid vehicle (referred to as a vehicle, hereinafter) 500 includes an internal combustion engine 10, a first motor generator (referred to as a first MG, hereinafter) 71, a second motor generator (referred to as a second MG, hereinafter) 72, a first invertor 75, a second invertor 76, and a battery 77.

The internal combustion engine 10, the first MG 71, and the second MG 72 serve as drive sources of the vehicle 500. Details of the internal combustion engine 10 will be described later. The first MG 71 is a generator motor that has both functions of an electric motor and an electric generator. The second MG 72 is a generator motor, similarly to the first MG 71. The first MG 71 is electrically connected with the battery 77 through the first invertor 75. The second MG 72 is electrically connected with the battery 77 through the second invertor 76. The first invertor 75 and the second invertor 76 convert electric power between direct-current power and alternating-current power. The battery 77 supplies electric power to the first MG 71 and the second MG 72, and stores electric power supplied from the first MG 71 and the second MG 72.

The vehicle 500 includes a dynamic power distribution-integration mechanism 40, a reduction gear 50, a speed reducer 60, a differential gear 61, and drive wheels 62. A crankshaft 14 that is an output shaft of the internal combustion engine 10 and a rotation shaft of the first MG 71 are joined to the dynamic power distribution-integration mechanism 40. Further, a rotation shaft of the second MG 72 is joined to the dynamic power distribution-integration mechanism 40 through the reduction gear 50. The dynamic power distribution-integration mechanism 40 is joined to the drive wheels 62 through the speed reducer 60 and the differential gear 61.

The dynamic power distribution-integration mechanism 40 is a planetary gear mechanism. The dynamic power distribution-integration mechanism 40 includes a sun gear 41, a ring gear 42, a plurality of pinion gears 43, and a carrier 44. The sun gear 41 is an external gear. The sun gear 41 rotates about its own axis. The ring gear 42 is an internal gear. The ring gear 42 rotates about the same axis as the axis of the sun gear 41. The pinion gears 43 are interposed between the sun gear 41 and the ring gear 42. Each pinion gear 43 engages with both of the sun gear 41 and the ring gear 42. Each pinion gear 43 can revolve around the sun gear 41. More specifically, each pinion gear 43 is supported by the carrier 44, so as to be capable of rotating about its own axis and to be capable of revolving around the sun gear 41.

With the revolution of each pinion gear 43, the carrier 44 rotates about the same axis as the axis of the sun gear 41. The sun gear 41 is joined to the rotation shaft of the first MG 71. The carrier 44 is joined to the crankshaft 14. A ring gear shaft 45 that is an output shaft of the ring gear 42 is joined to both of the reduction gear 50 and the speed reducer 60. The ring gear shaft 45 corresponds to a drive shaft.

The reduction gear 50 is a planetary gear mechanism. The reduction gear 50 includes a sun gear 51, a ring gear 52, and a plurality of pinion gears 53. The sun gear 51 is an external gear. The sun gear 51 rotates about its own axis. The ring gear 52 is an internal gear. The ring gear 52 rotates about the same axis as the axis of the sun gear 51. The pinion gears 53 are interposed between the sun gear 51 and the ring gear 52. Each pinion gear 53 engages with both of the sun gear 51 and the ring gear 52. Each pinion gear 53 is supported so as to be capable of rotating about its own axis and to be incapable of revolving around the sun gear 51. The sun gear 51 is joined to the rotation shaft of the second MG 72. The ring gear 52 is joined to the above ring gear shaft 45.

The crankshaft 14 of the internal combustion engine 10 inputs torque to the carrier 44 of the dynamic power distribution-integration mechanism 40. The dynamic power distribution-integration mechanism 40 distributes the torque to the sun gear 41 side and the ring gear 42 side. The torque distributed to the sun gear 41 side is input to the rotation shaft of the first MG 71. When the rotation shaft of the first MG 71 is rotated by the torque, the first MG 71 can function as an electric generator.

When the first MG 71 functions as an electric generator, the rotation shaft of the first MG 71 inputs torque to the sun gear 41 of the dynamic power distribution-integration mechanism 40. In this case, the dynamic power distribution-integration mechanism 40 distributes the input torque to the carrier 44 side and the ring gear 42 side. The torque input to the carrier 44 side is input to the crankshaft 14. By this torque, the crankshaft 14 is rotated. In this way, the first MG 71 can give the torque to the crankshaft 14.

The torque distributed from the internal combustion engine 10 to the ring gear 42 side or the torque of the first MG 71 is input to the drive wheels 62 through the ring gear shaft 45, the speed reducer 60, and the differential gear 61. At this time, the speed reducer 60 amplifies the input torque and then outputs the torque. The differential gear 61 allows a difference in rotation speed to be generated between the right and left drive wheels 62.

When the vehicle 500 decelerates, the second MG 72 functions as an electric generator, and thereby a regenerative braking power corresponding to an electricity generation amount of the second MG 72 is generated in the vehicle 500. On the other hand, when the second MG 72 functions as an electric motor, the torque of the second MG 72 is input to the drive wheels 62 through the reduction gear 50, the ring gear shaft 45, the speed reducer 60, and the differential gear 61.

The vehicle 500 includes a first rotation angle sensor 86, a second rotation angle sensor 87, an accelerator sensor 83, and a vehicle speed sensor 85. The first rotation angle sensor 86 is positioned near the rotation shaft of the first MG 71. The first rotation angle sensor 86 detects a rotation position Sm1 of the rotation shaft of the first MG 71. The second rotation angle sensor 87 is positioned near the rotation shaft of the second MG 72. The second rotation angle sensor 87 detects a rotation position Sm2 of the rotation shaft of the second MG 72. The accelerator sensor 83 detects an accelerator operation amount ACP that is an operation amount of an accelerator pedal in the vehicle 500. The vehicle speed sensor 85 is positioned near the drive wheel 62. The vehicle speed sensor 85 detects a vehicle speed SP that is a traveling speed of the vehicle 500.

Schematic Configuration of Internal Combustion Engine

As shown in FIG. 1, the internal combustion engine 10 includes an engine body 10A, the above crankshaft 14, a crank angle sensor 18, a coolant temperature sensor 82, and a knocking sensor 89.

The engine body 10A includes four cylinders 11. Each cylinder 11 is a space that is formed in the engine body 10A. Although not illustrated, each cylinder 11 contains a piston. The piston can reciprocate in each cylinder 11. The piston in each cylinder 11 is joined to the crankshaft 14 through a connecting rod. The crankshaft 14 rotates with the reciprocation of the piston in each cylinder 11. The crank angle sensor 18 is positioned near the crankshaft 14. The crank angle sensor 18 detects a rotation position Scr of the crankshaft 14.

The engine body 10A includes a water jacket 19. The water jacket 19 is a passage through which coolant flows. The water jacket 19 is positioned in the periphery of the four cylinders 11. The coolant temperature sensor 82 is positioned at an outlet portion of the water jacket 19. The coolant temperature sensor 82 detects a temperature THW of the coolant.

The knocking sensor 89 is attached to the engine body 10A. The knocking sensor 89 detects a vibration amount VJ of the engine body 10A. The internal combustion engine 10 includes four ignition plugs 16. The ignition plugs 16 are provided in the cylinders 11, respectively. A distal end of each ignition plug 16 is positioned in the corresponding cylinder 11. Each ignition plug 16 ignites the air-fuel mixture of intake air and fuel in each cylinder 11, by spark discharge.

The internal combustion engine 10 includes an intake passage 15, an air flow meter 81, and four fuel injection valves 17. The intake passage 15 is a passage for introducing the intake air into each cylinder 11. The intake passage 15 is connected with each cylinder 11. The air flow meter 81 is positioned at a halfway point of the intake passage 15. The air flow meter 81 detects an intake air amount GA of the intake air that flows through the intake passage 15. The four fuel injection valves 17 are positioned in the intake passage 15 on the downstream side of the air flow meter 81. The four fuel injection valves 17 are provided in the cylinders 11, respectively. The four fuel injection valves 17 inject the fuel into the cylinders 11, respectively.

The internal combustion engine 10 includes an exhaust passage 21, a three-way catalyst 22, and a gasoline particulate filter (referred to as a GPF, hereinafter) 23. The exhaust passage 21 is a passage for emitting exhaust gas from each cylinder 11. The exhaust passage 21 is connected with each cylinder 11. The three-way catalyst 22 is positioned at a halfway point of the exhaust passage 21. The three-way catalyst 22 purifies the exhaust gas. The three-way catalyst 22 has an oxygen storage capacity. The GPF 23 is positioned in the exhaust passage 21 on the downstream side of the three-way catalyst 22. The GPF 23 traps particulate matter (referred to as PM, hereinafter) contained in the exhaust gas.

Schematic Configuration of Control Device

The vehicle 500 includes a control device 100. The control device 100 can be configured as one or more processors that execute various processes in accordance with computer programs (software). The control device 100 executes at least some processes of the various processes. The control device 100 may be configured as one or more dedicated hardware circuits such as application specific integrated circuits (ASIC) or circuitry including a combination of dedicated hardware circuits. The processor includes a CPU, and a memory such as a RAM and a ROM. The memory stores program codes or commands configured such that the CPU executes processes. The memory is a computer-readable medium, and includes all available media that can be accessed by general-purpose or dedicated computers. The control device 100 includes a storage device that is an electrically rewritable nonvolatile memory.

The control device 100 receives detection signals from various sensors that are equipped in the vehicle 500. Specifically, the control device 100 receives the detection signals about the following parameters.

The intake air amount GA that is detected by the air flow meter 81

The temperature THW of the coolant that is detected by the coolant temperature sensor 82

The rotation position Scr of the crankshaft 14 that is detected by the crank angle sensor 18

The vibration amount VJ that is detected by the knocking sensor 89

The rotation position Sm1 of the rotation shaft of the first MG 71 that is detected by the first rotation angle sensor 86

The rotation position Sm2 of the rotation shaft of the second MG 72 that is detected by the second rotation angle sensor 87

The accelerator operation amount ACP that is detected by the accelerator sensor 83

The vehicle speed SP that is detected by the vehicle speed sensor 85

The control device 100 includes a hybrid control unit 102, an internal combustion engine control unit 104, and a motor control unit 106. The respective functional units will be described in order below.

Hybrid Control Unit

The hybrid control unit 102 integrally controls the vehicle 500. The hybrid control unit 102 calculates a target value (referred to as a target engine speed, hereinafter) of an engine speed NE that is the rotation speed of the crankshaft 14, and a target value (referred to as a target engine torque, hereinafter) of an engine torque that is the torque of the internal combustion engine 10, based on the accelerator operation amount ACP and the vehicle speed SP. Further, the hybrid control unit 102 calculates a target value (referred to as a target first MG torque, hereinafter) of the torque of the first MG 71, and a target value (referred to as a target second MG torque, hereinafter) of the torque of the second MG 72, based on the accelerator operation amount ACP and the vehicle speed SP.

Internal Combustion Engine Control Unit

The internal combustion engine control unit 104 controls various sites of the internal combustion engine 10, based on the target engine speed and target engine torque that are calculated by the hybrid control unit 102. Further, the internal combustion engine control unit 104 calculates various parameters indicating an engine operation state, as needed. Specifically, the internal combustion engine control unit 104 calculates the engine speed NE based on the rotation position Scr of the crankshaft 14. Further, the internal combustion engine control unit 104 calculates an engine load based on the engine speed NE and the intake air amount GA. Furthermore, the internal combustion engine control unit 104 calculates an accumulation amount W of the PM trapped by the GPF 23, based on the engine load and the temperature THW of the coolant.

The internal combustion engine control unit 104 can execute an ignition time calculation process, as a process for controlling the internal combustion engine 10. In the ignition time calculation process, the internal combustion engine control unit 104 calculates a target ignition time UG that is a target value of the ignition time of the ignition plug 16. The internal combustion engine control unit 104 controls the ignition plug 16 such that the ignition is performed by the ignition plug 16 at the target ignition time UG calculated in the ignition time calculation process.

The internal combustion engine control unit 104 can execute a first process, as a process for controlling the internal combustion engine 10. The internal combustion engine control unit 104 can execute a stop process, as part of the first process. The stop process is a process for combusting the PM trapped by the GPF 23 and removing the PM from the GPF 23. In the stop process, the internal combustion engine control unit 104 stops the combustion of the air-fuel mixture in one cylinder 11 of the four cylinders 11, that is, stop the combustion control for the one cylinder 11. Specifically, in the stop process, the internal combustion engine control unit 104 repeats a partial fuel cut in a plurality of continuous cycles. In the partial fuel cut, in one combustion cycle, the internal combustion engine control unit 104 stops the combustion of the air-fuel mixture in one cylinder 11 of the four cylinders 11, and executes the combustion of the air-fuel mixture in the other three cylinders 11. That is, in the stop process, a combustion period during which the combustion of the air-fuel mixture is continuously performed in the three cylinders 11 and a non-combustion period during which the combustion of the air-fuel mixture is not performed in the one cylinder 11 are repeated. Namely, the "period" herein is not defined by an absolute time period, but is defined by a period equivalent to one cylinder, a period equivalent to two cylinders, or the like. Accordingly, time intervals of the combustion period and the non-combustion period vary depending on the engine speed NE.

The internal combustion engine control unit 104 stops the fuel injection for a stop cylinder that is a cylinder 11 in which the combustion of the air-fuel mixture is stopped. On the other hand, the internal combustion engine control unit 104 performs the fuel injection for a combustion cylinder that is a cylinder 11 in which the combustion of the air-fuel mixture is executed, such that the air-fuel ratio of the air-fuel mixture in the combustion cylinder is richer than a stoichiometric air-fuel ratio. When the internal combustion engine control unit 104 executes the stop process, the engine speed NE becomes lower than the target engine speed due to the stop of the combustion of the air-fuel mixture in the stop cylinder. Further, the engine torque becomes lower than the target engine torque.

The internal combustion engine control unit 104 can execute a prohibition determination process, as a process for controlling the internal combustion engine 10. In the prohibition determination process, when the target ignition time UG is on the retard side of a prescribed time UT, that is, when the target ignition time UG is later than the prescribed time UT, the internal combustion engine control unit 104 prohibits the execution of the stop process. The internal combustion engine control unit 104 previously stores the prescribed time UT. Details of the prescribed time UT will be described later.

When the above stop process is executed, a compensation process described later is executed concomitantly with the stop process. Further, when the stop process is executed, an ordinary process that is performed for the combustion of the air-fuel mixture by the internal combustion engine control unit 104 at ordinary time is interrupted. Therefore, if the execution and interruption of the stop process are repeated in a short period, the execution and interruption of these processes are repeated, so that contents of processes that are executed by the control device 100 becomes complicated. As a result, the processing load on the control device 100 increases. Further, if the execution and interruption of the stop process are repeated in a short period, the stop process is performed many times even though the combustion removal of the PM in the GPF 23 does not proceed, so that the execution of the stop process becomes in vain. In view of the circumstance, until a predetermined fixed period C elapses after the prohibition of the execution of the stop process, the internal combustion engine control unit 104 continues to prohibit the stop process, regardless of the target ignition time UG. The above fixed period C is an expected time interval in which the processing load on the control device 100 can be reduced, and is previously set by experiments, for example. Further, in the case where the target ignition time UG gets to be on the retard side of the prescribed time UT at a certain timing, there is a high possibility that a situation where the target ignition time UG easily gets to be on the retard side of the prescribed time UT is continued until a reasonable period elapses from the certain timing. The above certain period C is set also in consideration of an expected duration during which the situation where the target ignition time UG easily gets to be on the retard side of the prescribed time UT is continued.

Motor Control Unit

The motor control unit 106 controls the first MG 71 and the second MG 72, based on the target first MG torque and the target second MG torque that are calculated by the hybrid control unit 102. The motor control unit 106 substantially controls the first invertor 75, and thereby controls the first MG 71. Further, the motor control unit 106 controls the second invertor 76, and thereby controls the second MG 72.

The motor control unit 106 can execute a second process, as a process for controlling the second MG 72. The motor control unit 106 can execute the compensation process, as part of the second process. As described above, when the internal combustion engine control unit 104 executes the stop process, the engine speed NE and the engine torque decrease. Hence, in the compensation process, the motor control unit 106 controls the second MG 72, such that the second MG 72 compensates an engine torque that is lost in the non-combustion period in the stop process, that is, such that the second MG 72 compensates a drive power that is lost due to the stop of the combustion control in one cylinder 11. On that occasion, the motor control unit 106 calculates a target compensation torque that is a target value of a torque for compensating the engine torque that is lost in the non-combustion period. Then, the motor control unit 106 controls the second MG 72 such that the target compensation torque is output at a timing corresponding to the non-combustion period. The target compensation torque has a magnitude allowing the compensation of all the engine torque that is lost in the non-combustion period when it is assumed that the target ignition time UG of the ignition plug 16 is an MBT ignition time. The MBT ignition time is an ignition time allowing the maximum torque to be obtained in the current engine operation state.

The prescribed time UT that is used in the above prohibition determination process will be described in relation to the target compensation torque. As described above, in the compensation process, a decrease amount of the engine torque due to the stop process is compensated by an output of the second MG 72 that corresponds to the target compensation torque. The target compensation torque is a torque that is calculated under the assumption that the target ignition time UG is the MBT ignition time. Therefore, when the target ignition time UG is on the retard side of the MBT ignition time, the decrease amount of the engine torque due to the stop process sometime cannot be appropriately compensated by the output of the second MG 72 that corresponds to the target compensation torque. The above prescribed time UT is a limit value on the retard side in a range of the ignition time when the decrease amount of the engine torque due to the stop process can be appropriately compensated by the output from the second MG 72 that corresponds to the target compensation torque, and is previously set by experiments, for example. When the engine torque decreases due to the stop process, a torque shock due to the decrease acts on the ring gear shaft 45. In the case where the decrease in the engine torque can be appropriately compensated by the output from the second MG 72 that corresponds to the target compensation torque, the torque shock that acts on the ring gear shaft 45 can be reduced, and further the vibration that acts on the vehicle 500 can be reduced. That is, the above prescribed time UT is set to such a value that the vibration that is generated in the vehicle 500 can be kept within an acceptable range.

Specific Processing Procedure for Ignition Time Calculation Process

Specific processing procedures for the respective processes will be described below in the order of the ignition time calculation process, the prohibition determination process, the first process, and the second process.

Figure 2:
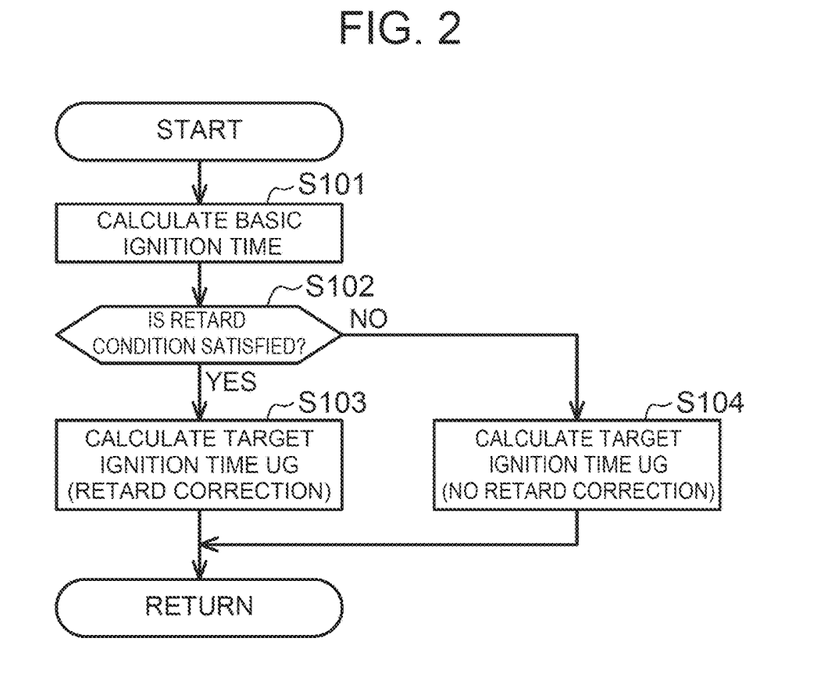
FIG. 2 is a flowchart illustrating a processing procedure of an ignition time calculation process.

The internal combustion engine control unit 104 repeatedly executes the ignition time calculation process while an ignition switch of the vehicle 500 is in an on-state. As shown in FIG. 2, when the ignition time calculation process is started, the internal combustion engine control unit 104 executes the process of step S101.

In step S101, the internal combustion engine control unit 104 calculates a basic ignition time. Specifically, the internal combustion engine control unit 104 refers to the latest engine speed NE and engine load. Then, the internal combustion engine control unit 104 calculates the basic ignition time based on the latest engine speed NE and engine load. In the embodiment, the basic ignition time is the MBT ignition time. After the execution of the process of step S101, the internal combustion engine control unit 104 causes the ignition time calculation process to proceed to step S102.

In step S102, the internal combustion engine control unit 104 determines whether a retard condition is satisfied. In the case where the retard condition is satisfied, it is necessary to perform a retard correction of the basic ignition time. The retard condition is a condition that at least one of a plurality of retard items is met. Specifically, the retard items are the following two items.

(A) The vehicle 500 is decelerating, and the engine torque is equal to or lower than a prescribed torque ZT.

(B) A retard correction amount for solving the knocking is not zero.

As for the above (A), in the case where the engine torque has decreased by a certain degree while the vehicle 500 is decelerating, it is preferable to cause the internal combustion engine 10 to transition to a state where the internal combustion engine 10 has a minimal engine speed NE at which the internal combustion engine 10 can continue the drive independently, that is, an idling state. It is necessary to retard the ignition time for realizing the transition to the idling state. For this reason, the above (A) is set. The above prescribed torque ZT is a value at which the torque shock can be expected not to be generated even when the internal combustion engine 10 transitions to the idling state on the premise that the vehicle 500 is decelerating, and is previously set by experiments, for example. The internal combustion engine control unit 104 determines whether the above (A) is satisfied, by referring to the latest values of parameters necessary to determine whether the above (A) is satisfied, for example, by referring to the vehicle speed SP and the engine speed NE.

As for the above (B), in the case where the knocking has occurred in the internal combustion engine 10, it is necessary to retard the ignition time for curbing the knocking. For this reason, the requirement (B) is set. The retard correction amount is zero in the case where the knocking has not occurred in the internal combustion engine 10. On the other hand, the retard correction amount is a positive value in the case where the knocking has occurred in the internal combustion engine 10. The retard correction amount gradually increases when the knocking is continued. The retard correction amount is the absolute value of a value by which the ignition tine is changed to the retard side. In the background, the internal combustion engine control unit 104 repeatedly executes a knocking determination process of determining whether the knocking has occurred in the internal combustion engine 10. In the knocking determination process, the internal combustion engine control unit 104 determines whether the knocking has occurred, for each cylinder 11, based on the vibration amount VJ that is detected by the knocking sensor 89. The internal combustion engine control unit 104 calculates the retard correction amount based on the determination result of the knocking determination process, and determines whether the requirement (B) is satisfied, based on the retard correction amount.

In the case where neither of the two retard items is satisfied in step S102, the internal combustion engine control unit 104 determines that the retard condition is not satisfied (step S102: NO). In this case, the internal combustion engine control unit 104 causes the ignition time calculation process to proceed to step S104.

In step S104, the internal combustion engine control unit 104 calculates the basic ignition time with no change, as the target ignition time UG. Therefore, the internal combustion engine control unit 104 once ends a sequence of processes in the ignition time calculation process. Then, the internal combustion engine control unit 104 executes the process of step S101 again.

On the other hand, in the case where at least one of the two retard items is satisfied in step S102, the internal combustion engine control unit 104 determines that the retard condition is satisfied (step S102: YES). In this case, the internal combustion engine control unit 104 causes the ignition time calculation process to proceed to step S103.

In step S103, the internal combustion engine control unit 104 performs the retard correction of the basic ignition time calculated in step S101. Then, the internal combustion engine control unit 104 calculates a value after the retard correction, as the target ignition time UG. The internal combustion engine control unit 104 sets the correction amount for the retard correction, in consideration of the retard item for which the determination of the satisfaction has been made in step S102 and the current engine operation state. That is, in the case where the retard item (A) is satisfied, the ignition time is changed to the retard side of the MBT ignition time, by an amount previously set as a value that allows weakening of the torque shock due to the transition to the idling state. Further, in the case where the retard item (B) is satisfied, the ignition time is changed to the retard side of the MBT ignition time, by the retard correction amount for solving the knocking. After the calculation of the target ignition time UG, the internal combustion engine control unit 104 once ends a sequence of processes in the ignition time calculation process. Then, the internal combustion engine control unit 104 executes the process of step S101 again.

Specific Processing Procedure for Prohibition Determination Process

Figure 3:
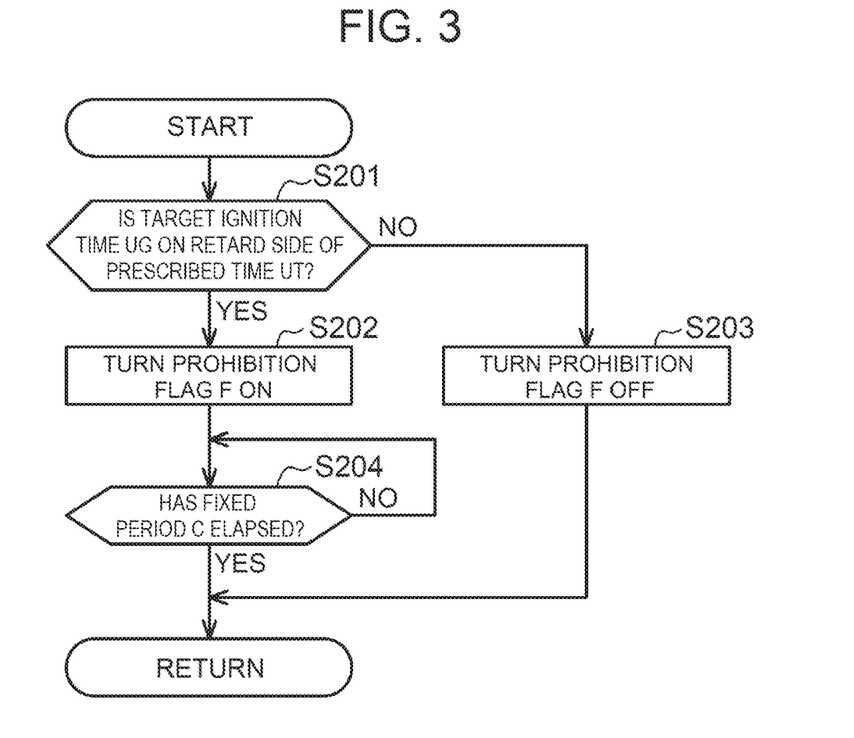
FIG. 3 is a flowchart illustrating a processing procedure of a prohibition determination process.

The internal combustion engine control unit 104 repeatedly executes the prohibition determination process while the ignition switch of the vehicle 500 is in the on-state. As shown in FIG. 3, when the prohibition determination process is started, the internal combustion engine control unit 104 executes the process of step S201.

In step S201, the internal combustion engine control unit 104 determines whether the target ignition time UG is on the retard side of the prescribed time UT. Specifically, the internal combustion engine control unit 104 refers to the latest target ignition time UG. Then, the internal combustion engine control unit 104 compares the target ignition time UG and the prescribed time UT. In the case where the target ignition time UG is the same as the prescribed time UT or is on the advance side of the prescribed time UT (step S201: NO), the internal combustion engine control unit 104 causes the prohibition determination process to proceed to step S203.

In step S203, the internal combustion engine control unit 104 turns off a prohibition flag F indicating the prohibition of the execution of the stop process. Thereafter, the internal combustion engine control unit 104 once ends a sequence of processes in the prohibition determination process. Then, the internal combustion engine control unit 104 executes the process of step S201 again.

On the other hand, in the case where the target ignition time UG is on the retard side of the prescribed time UT in step S201 (step S201: YES), the internal combustion engine control unit 104 causes the prohibition determination process to proceed to step S202.

In step S202, the internal combustion engine control unit 104 turns the prohibition flag F on. Thereafter, the internal combustion engine control unit 104 causes the prohibition determination process to proceed to step S204. In step S204, the internal combustion engine control unit 104 determines whether the fixed period C has elapsed since the end of the process of step S202. In the case where the fixed period C has not elapsed since the end of the process of step S202 (step S204: NO), the internal combustion engine control unit 104 executes the process of step S204 again. The internal combustion engine control unit 104 repeats the process of step S204 until the fixed period C has elapsed. When the fixed period C has elapsed (step S204: YES), the internal combustion engine control unit 104 once ends a sequence of processes in the prohibition determination process. Then, the internal combustion engine control unit 104 executes the process of step S201 again. In the process of step S204, during the fixed period C after the prohibition flag F is turned on, the on-state of the prohibition flag F is continued regardless of the target ignition time UG.

Specific Processing Procedure for First Process

Figure 4A:
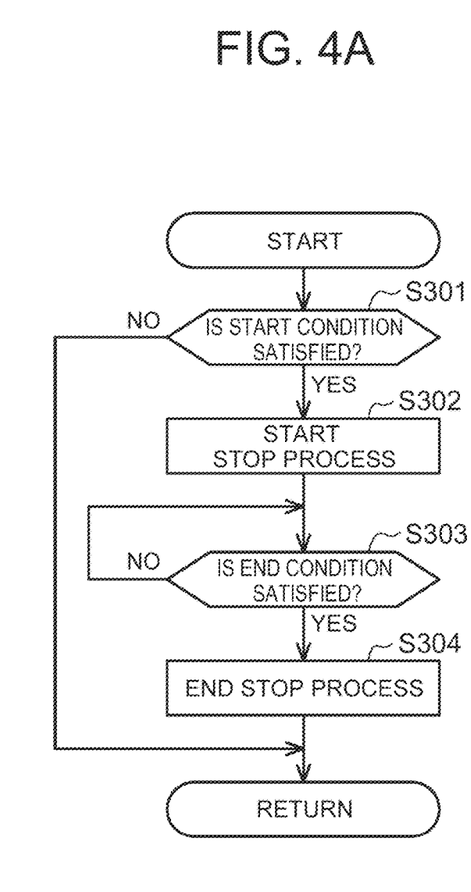
FIG. 4A is a flowchart illustrating processing procedures of a first process.

The internal combustion engine control unit 104 repeatedly executes the first process while the ignition switch of the vehicle 500 is in the on-state. As shown in FIG. 4A, when the first process is started, the internal combustion engine control unit 104 executes the process of step S301.

In step S301, the internal combustion engine control unit 104 determines whether a start condition for the stop process is satisfied. The start condition is a condition that all of a plurality of start items are met. The start items include the following contents.

(A1) The accumulation amount W of the PM in the GPF 23 is equal to or larger than a first prescribed amount W1.

(A2) The prohibition flag F is in the off-state.

(A3) A state where the target engine speed can be regarded as being roughly constant is continuing for a first setting period H1 or longer.

(A4) The vehicle speed SP is higher than zero.

The first prescribed amount W1 is such a value that the accumulation amount W of the PM in the GPF 23 is sufficiently large and it is desired to remove the PM from the GPF 23, and is previously set by experiments, for example. When the target engine speed suddenly changes, for example, when the acceleration is requested, it is not preferable to stop the combustion of the air-fuel mixture by performing the stop process. From this standpoint, the above (A3) is set as a start item. The first setting period H1 is such a value that a state where the target engine speed is stable can be regarded as being continuing, and is previously set by experiments, for example. Further, during the stop of the vehicle 500, it is preferable to stop the operation of the internal combustion engine 10 such that the fuel consumption amount becomes "0". From this standpoint, the above (A4) is set as a start item.

In the process of step S301, the internal combustion engine control unit 104 refers to the latest information and past histories about parameters necessary to determine whether the start items are satisfied, as exemplified by the accumulation amount W of the PM, the prohibition flag F, the target engine speed, and the vehicle speed SP. Then, the internal combustion engine control unit 104 determines whether the start items are satisfied, based on the information.

In the case where at least one of the start items is not met in step S301, the internal combustion engine control unit 104 determines that the start condition is not satisfied (step S301: NO). In this case, the internal combustion engine control unit 104 once ends a sequence of processes in the first process. Then, the internal combustion engine control unit 104 executes the process of step S301 again.

On the other hand, in the case where all of the start items are met in step S301, the internal combustion engine control unit 104 determines that the start condition is satisfied (step S301: YES). In this case, the internal combustion engine control unit 104 causes the first process to proceed to step S302.

In step S302, the internal combustion engine control unit 104 cancels the above ordinary process relevant to the combustion of the air-fuel mixture, and starts the stop process. As described above, in the stop process, the internal combustion engine control unit 104 stops the fuel injection for the stop cylinder, and performs the fuel injection for the combustion cylinder, such that the air-fuel ratio of the air-fuel mixture is richer than the stoichiometric air-fuel ratio. Due to the stop process, oxygen is emitted from the stop cylinder to the exhaust passage 21. On the other hand, unburnt fuel is emitted from the combustion cylinder to the exhaust passage 21. When the oxygen and unburnt fuel emitted to the exhaust passage 21 reaches the three-way catalyst 22, the unburnt fuel is burnt in the three-way catalyst 22, and the temperature of the exhaust gas rises. Then, when the high-temperature exhaust gas reaches the GPF 23, the temperature of the GPF 23 rises. When the oxygen emitted from the stop cylinder to the exhaust passage 21 reaches the GPF 23, the combustion removal of the PM trapped in the GPF 23 is performed. After the start of the stop process in step S302, the internal combustion engine control unit 104 causes the first process to proceed to step S303.

In step S303, the internal combustion engine control unit 104 determines whether an end condition for the stop process is satisfied. The end condition is a condition that at least one of a plurality of end items is met. The end items include the following contents.

(B1) The accumulation amount W of the PM in the GPF 23 is equal to or smaller than a second prescribed amount W2.

(B2) An elapsed time from the start of the stop process is equal to or longer than a second setting period H2.

(B3) The prohibition flag F is in the on-state.

(B4) The target engine speed has changed suddenly.

(B5) The vehicle speed SP is zero.

The second prescribed amount W2 is such a value that the accumulation amount W of the PM in the GPF 23 is sufficiently small and the stop process may be ended, and is previously set by experiments, for example. The second setting period H2 is a value slightly shorter than the maximum period during which the continuation of the stop process is acceptable, in consideration of balance with other controls, and is previously set by experiments, for example. Here, (B4) and (B5) are set from the same standpoint as the above (A3) and (A4). In the process of step S303, the internal combustion engine control unit 104 refers to the latest information and past histories about parameters necessary to determine whether the end items are satisfied, similarly to the process of step S301. Then, the internal combustion engine control unit 104 determines whether the end items are satisfied, based on the information.

In the case where none of the end items is met in step S303, the internal combustion engine control unit 104 determines that the end condition is not satisfied (step S303: NO). In this case, the internal combustion engine control unit 104 executes the process of step S303 again. The internal combustion engine control unit 104 repeats the process of step S303 until at least one of the end items is met. Then, in the case where at least one of the end items is met, the internal combustion engine control unit 104 determines that the end condition is satisfied (step S303: YES). In this case, the internal combustion engine control unit 104 causes the first process to proceed to step S304.

In step S304, the internal combustion engine control unit 104 ends the stop process. Then, the internal combustion engine control unit 104 restarts the ordinary process. After the execution of the process of step S304, the internal combustion engine control unit 104 once ends a sequence of processes in the first process, and executes the process of step S301 again.

Specific Processing Procedure for Second Process

Figure 4B:
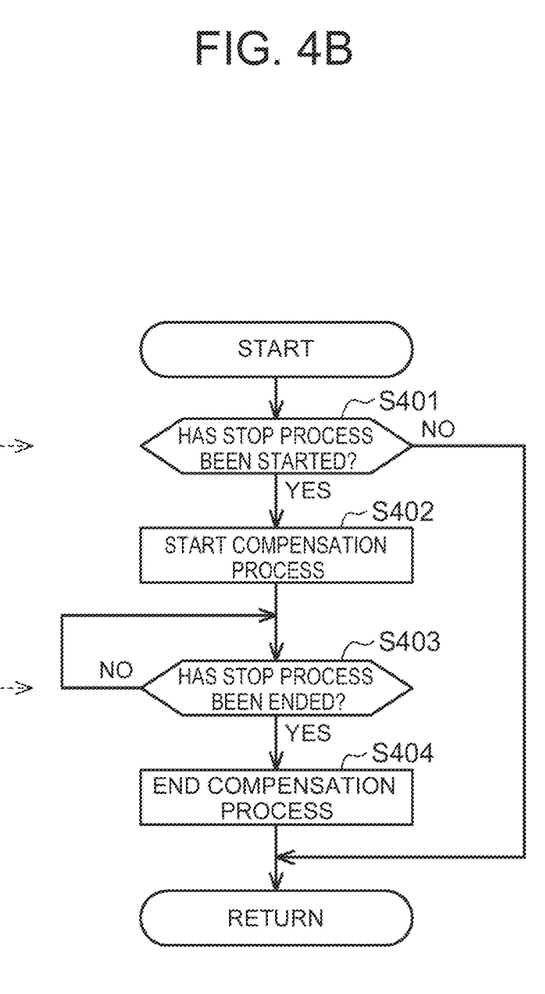
FIG. 4B is a flowchart illustrating processing procedures of a second process.

The motor control unit 106 repeatedly executes the second process while the ignition switch of the vehicle 500 is in the on-state. As shown in FIG. 4B, when the second process is started, the motor control unit 106 executes the process of step S401.

In step S401, the motor control unit 106 determines whether the internal combustion engine control unit 104 has started the stop process. In the case where the internal combustion engine control unit 104 has not started the stop process (step S401: NO), the motor control unit 106 once ends a sequence of processes in the second process, and executes the process of step S401 again.

On the other hand, in the case where the internal combustion engine control unit 104 has started the stop process in step S401 (step S401: YES), the motor control unit 106 causes the second process to proceed to step S402.

In step S402, the motor control unit 106 starts the compensation process. As described above, in the compensation process, the motor control unit 106 calculates the target compensation torque, and controls the second MG 72 such that the target compensation torque is output at the timing corresponding to the non-combustion period. For example, the motor control unit 106 calculates the target compensation torque by referring to a compensation torque map. In the compensation torque map, for each engine speed NE, a target compensation torque needed when the target ignition time UG is the MBT ignition time is set as a variable with respect to the rotation position Scr of the crankshaft 14. The motor control unit 106 calculates the engine speed NE based on the rotation position Scr of the crankshaft 14, and calculates the compensation target torque corresponding to the engine speed NE, from the compensation torque map. In this manner, the motor control unit 106 may calculate the target compensation torque. After the start of the compensation process in the process of step S402, the motor control unit 106 causes the second process to proceed to step S403.

In the step S403, the motor control unit 106 determines whether the internal combustion engine control unit 104 has ended the stop process. In the case where the internal combustion engine control unit 104 has not ended the stop process (step S403: NO), the motor control unit 106 executes the process of step S403 again. The motor control unit 106 repeats the process of step S403 until the internal combustion engine control unit 104 has ended the stop process. Then, when the internal combustion engine control unit 104 has ended the stop process (step S403: YES), the motor control unit 106 causes the second process to proceed to step S404.

In step S404, the motor control unit 106 ends the compensation process. Thereafter, the motor control unit 106 once ends a sequence of processes in the second process, and executes the process of step S401 again.

Operation of Embodiment

Figure 5A:
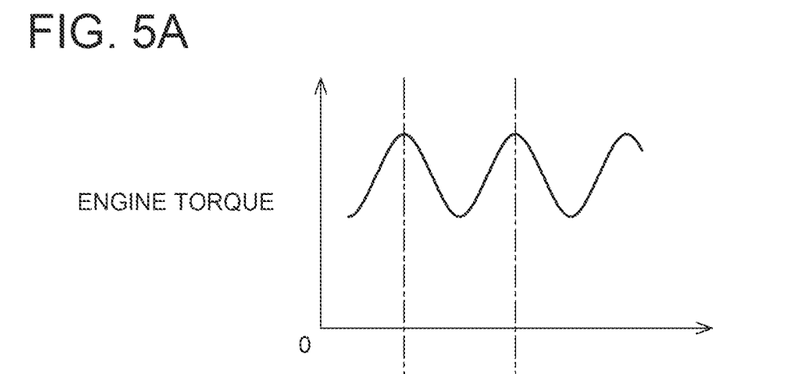
FIG. 5A is a diagram showing exemplary temporal change in torques of an internal combustion engine.
Figure 5B:
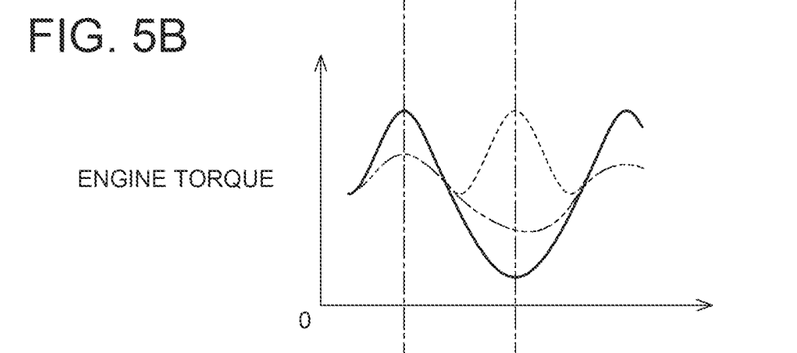
FIG. 5B is a diagram showing exemplary temporal change in torques of the internal combustion engine.
Figure 5C:
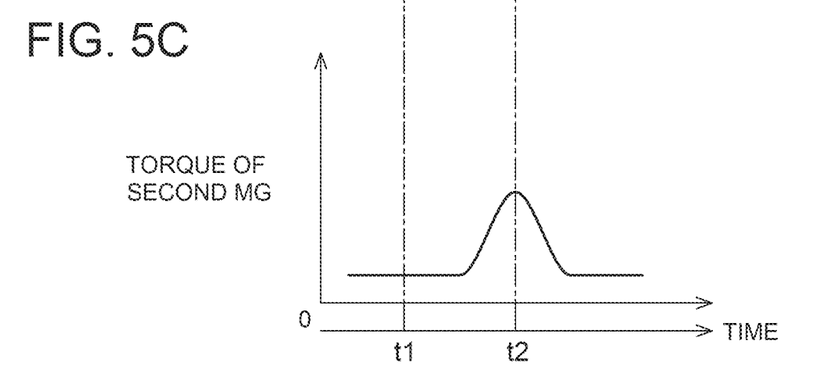
FIG. 5C is a diagram showing exemplary temporal change in torques of a second motor generator.

Suppose that the combustion of the air-fuel mixture is performed in the cylinders 11 in the state where the target ignition time UG is the MTB ignition time. As shown in FIG. 5A, in the case where the combustion of the air-fuel mixture is performed in all cylinders 11 in sequence, the engine torque repeatedly increases at timings of combustion strokes of the cylinders 11. That is, the engine torque periodically changes depending on the rotation position Scr of the crankshaft 14. On the other hand, in the case where the stop process is performed, as shown by a solid line in FIG. 5B, the engine torque considerably decreases at a timing t2 when the combustion stroke would be performed if the stop process were not performed. As shown in FIG. 5C, in the compensation process, the second MG 72 outputs torque at a timing when the engine torque becomes a minimal value corresponding to the stop cylinder in the case where the stop process is performed. Here, a dotted line in FIG. 5B indicates the engine torque in the case where the combustion of the air-fuel mixture is performed in all cylinders 11 in sequence.

Suppose that the target ignition time UG suddenly changes to the retard side of the MTB ignition time in the state where the stop process is being performed. Further, suppose that the target ignition time UG changes to the retard side of the prescribed time UT. In this case, as shown by a two-dot chain line in FIG. 5B, the engine torque decreases at a timing t1 of the combustion stroke of the combustion cylinder. Thereby, the whole phase of the fluctuating engine torque suddenly changes. Therefore, the decrease amount of the engine torque at the timing t2 of the combustion stroke of the stop cylinder and the timing of the minimal value of the engine torque are shifted from those in the case where the target ignition time UG is the MTB ignition time.

In the compensation process, the torque that is output from the second MG 72 is based on the premise that the target ignition time UG is the MTB ignition time. Therefore, when such a torque is output under a situation where the target ignition time UG is on the retard side of the prescribed time UT, there is a gap in phase relative to the timing of the decrease in the engine torque, so that it is not possible to appropriately cancel out the decrease in the engine torque. Depending on the amount of the gap in the phase of the engine torque, by adding the torque from the second MG 72 by the compensation process to the engine torque, a new peak of the phase is generated, or the peak of the phase is increased.

Hence, in the prohibition determination process, in the case where the target ignition time UG is on the retard side of the prescribed time UT, the prohibition flag F for the stop process is turned on, and the execution of the stop process is prohibited. Thereby, in the case where the target ignition time UG is on the retard side of the prescribed time UT, the stop process is not executed.

Effect of Embodiment (1) As a handling in the case where the target ignition time UG suddenly changes during the execution of the stop process, it is possible that the motor control unit 106 acquires information indicating the sudden change in the target ignition time UG and the motor control unit 106 calculates a target compensation torque commensurate with the target ignition time UG after the change. However, in the case where the motor control unit 106 acquires the information indicating the change in the target ignition time UG, a long time is correspondingly required for exchanging the information between the internal combustion engine control unit 104 and the motor control unit 106. Furthermore, after the motor control unit 106 acquires the information indicating the change in the target ignition time UG, a long time is correspondingly required also for a process in which the motor control unit 106 calculates the target compensation torque in consideration of the change in the target ignition time UG. Accordingly, it is difficult to rapidly calculate the target compensation torque corresponding to the target ignition time UG after the change, before the timing of the combustion stroke of the stop cylinder after the change in the target ignition time UG, and to output, from the second MG, the torque corresponding to the target ignition timing UG after the change, at the timing of the combustion stroke of the stop cylinder. Further, the waveform of the phase of the engine torque in the case where the target ignition time UG is reasonably greatly changed to the retard side is an irregular waveform, and therefore, even if communication speed and processing speed are increased for coping with the above problem, it is very hard to control the second MG 72 such that the second MG 72 outputs a torque having an opposite phase to the decrease in the engine torque due to the stop process.

In the embodiment, in the case where the target ignition time UG is greatly changed to the retard side, the stop process is not performed. That is, in the case where there is a risk that it is not possible to compensate the change in the engine torque due to the stop process, the stop process is not executed. Accordingly, it is possible to prevent the generation of vibration or the like that is caused by the failure of the compensation of the torque change during the stop process.

(2) In the embodiment, the prohibition of the stop process is continued until the fixed period C elapses after the prohibition of the execution of the stop process. Therefore, it is possible to prevent the repeat of the execution and interruption of the stop process in a short period. Thereby, it is possible to prevent the drive of the internal combustion engine 10 from being unstable due to the repeat of the execution and interruption of the stop process. Further, it is possible to reduce the processing load on the control device 100.

Modification

The embodiment can be carried out while being modified as described below. The embodiment and modifications described below can be carried out while being combined with each other, as long as there is no technical inconsistency.

- In addition to or instead of turning the prohibition flag F on in the situation where the target ignition time UG is actually on the retard side of the prescribed time UT, it is allowable to turn the prohibition flag F on in a situation where there is a probability that the target ignition time UG gets to be on the retard side of the prescribed time UT. As such a situation, for example, there is a situation where a retard item of the retard condition is satisfied. For example, when the retard item (A) is satisfied, the target ignition time UG may be regarded as being on the retard side of the prescribed time UT, and the prohibition flag F may be turned on. Further, when the retard item (B) is satisfied and a period during which it is continuously determined that the knocking has occurred is equal to or longer than a predetermined prescribed period ZH, the target ignition time UG may be regarded as being on the retard side of the prescribed time UT, and the prohibition flag F may be turned on. As described above, as the continuous period during which the knocking has occurred is longer, the retard correction amount is larger. Therefore, as the continuous period during which the knocking has occurred is longer, there is a higher possibility that the target ignition time UG gets to be on the retard side of the prescribed time UT. In this example, it is possible to prevent, in advance, the generation of the vibration or the like that is caused by the failure of the compensation of the torque change due to the stop process.
- The contents and number of retard items are not limited to the example in the above embodiment. Other items may be set in addition to or instead of the retard items shown in the above embodiment. Further, the number of retard items may be one.
- When the target ignition time UG is retarded, the rise in the temperature of the GPF 23 can be promoted. Hence, it is allowable to adopt a configuration in which the internal combustion engine control unit 104 can execute a filter regeneration process of performing the combustion removal of the PM trapped in the GPF 23 using the retardation of the target ignition time UG. Further, a requirement that the filter regeneration process is being executed may be employed as a retard item. In the case of the configuration in which the internal combustion engine control unit 104 can execute the filter regeneration process, for example, the following items may be set as execution conditions for the filter regeneration process. The first item is a condition that the accumulation amount W of the PM in the GPF 23 is equal to or larger than a prescribed accumulation amount ZW. The prescribed accumulation amount ZW may be preciously set to a value at which it is desired to remove the PM. The prescribed accumulation amount ZW may be the same as the first prescribed amount W1, or may be different from the first prescribed amount W1. The second item is a condition that the intake air amount GA is equal to or larger than a prescribed intake air amount that is necessary for the combustion removal of the PM. The third item is a condition that the vehicle speed SP is higher than zero. That is, the execution of the filter regeneration process during the stop of the vehicle 500 is avoided. When all of the items are met, it may be determined that the execution condition is satisfied, and the filter regeneration process may be performed.
- In the case of the configuration in which the internal combustion engine control unit 104 can execute the filter regeneration process as described in the above modification, the execution condition for the filter regeneration process is not limited to the above condition. The execution condition only needs to include the first item.
- In the case of the configuration in which the internal combustion engine control unit 104 can execute the filter regeneration process as described in the above modification, the target ignition time UG is retarded due to the execution of the filter regeneration process. Accordingly, there is a probability that the target ignition time UG gets to be on the retard side of the prescribed time UT. Hence, in addition to or instead of turning the prohibition flag F on in the situation where the target ignition time UG is actually on the retard side of the prescribed time UT, it is allowable to regard the target ignition time UG as being on the retard side of the prescribed time UT and turn the prohibition flag F on when the filter regeneration process is being executed. In this example, it is possible to prevent, in advance, the generation of the vibration or the like that is caused by the failure of the compensation of the torque change due to the stop process.
- The whole configuration of the vehicle 500 is not limited to the example in the above embodiment. For example, a speed change gear having a plurality of gear stages may be employed instead of the speed reducer 60.
- In the case where the vehicle 500 is equipped with a speed change gear having a plurality of gear stages as described in the above modification, when the gear stage of the speed change gear is being switched, it is preferable to retard the target ignition time UG for reducing a speed change shock due to the switching of the gear stage. Hence, a requirement that the speed change gear is switching the gear stage is employed as a retard item.
- In the case where the vehicle 500 is equipped with the speed change gear as described in the above modification, the target ignition time UG is retarded when the speed change gear is switching the gear stage. Accordingly, there is a probability that the target ignition time UG gets to be on the retard side of the prescribed time UT. Hence, in addition to or instead of turning the prohibition flag F on in the situation where the target ignition time UG is actually on the retard side of the prescribed time UT, it is allowable to regard the target ignition time UG as being on the retard side of the prescribed time UT and turn the prohibition flag F on when the speed change gear is switching the gear stage. In this example, it is possible to prevent, in advance, the generation of the vibration or the like that is caused by the failure of the compensation of the torque change due to the stop process.

The content of the stop process is not limited to the example in the above embodiment. During the execution of the stop process, the number of stop cylinders may be increased or decreased. In the stop process, it is only necessary to repeat the combustion period during which the combustion of the air-fuel mixture is performed in the cylinder 11 and the non-combustion period during which the combustion of the air-fuel mixture is not performed in the cylinder 11. That is, the stop process only needs to be a process of stopping the combustion control for some cylinders 11 of the four cylinders 11.

In the above embodiment, the stop process is performed for the purpose of the combustion removal of the PM from the GPF 23. However, the purpose of the stop process is not limited to this. Depending on the purpose of the stop process, the content of the stop process may be changed when appropriate.

The contents of the start condition and end condition in the first process are not limited to the example in the above embodiment. Depending on the content and purpose of the stop process, appropriate contents may be set as the start condition and the end condition.

The basic ignition time is not limited to the MGT ignition time. When appropriate, the basic ignition time may be corrected using the MGT ignition time as the standard, depending on the engine operation state. The basic ignition time only needs to be an appropriate ignition time depending on the engine operation state.

The magnitude of the target compensation torque is not limited to the example in the above embodiment. The target compensation torque only needs to have a magnitude allowing the compensation of at least part of the engine torque that is lost due to the stop process.

The setting method for the target compensation torque is not limited to the example in the above embodiment. The ignition time that is the standard for setting the target compensation torque may be other than the MGT ignition time. The ignition time that is the standard for setting the target compensation torque may vary depending on the engine operation state, instead of setting a constant time regardless of the engine operation state. The setting method for the target compensation torque does not matter, as long as the target compensation torque can be set as a torque that can compensate some amount of the engine torque lost due to the stop process.

The prescribed time UT is not limited to the example in the above embodiment. The prescribed time UT only needs to be set in consideration of the ignition time that is the standard for setting the target compensation torque. The prescribed time UT only needs to be such a period that the vibration of the vehicle 500 can be kept within an acceptable range.

When the state where the target ignition time UG is on the retard side of the prescribed time UT is continued for a reasonable period, the prohibition flag F may be turned on. In this case, the stop process is not prohibited when the target ignition time UG instantaneously gets to be on the retard side of the prescribed time UT for some reason.

It is not always necessary to continue the prohibition of the stop process until the fixed period C elapses after the start of the prohibition of the execution of the stop process.

The engine torque lost due to the stop process may be output from the first MG 71, instead of the second MG 72. The torque of the first MG 71 may be given to the crankshaft 14. In this manner, the engine torque lost due to the stop process may be compensated.

The vehicle only needs to have a configuration in which the internal combustion engine and the motor generator are used as drive sources and the internal combustion engine and the motor generator are joined to the drive shaft. For example, only one motor generator may be used. In such a vehicle, the motor generator may be controlled so as to compensate the engine torque lost due to the stop process. The drive shaft is not limited to the ring gear shaft 45, and only needs to transmit the drive power of the internal combustion engine and the motor generator, to the drive wheels.

The configuration of the internal combustion engine 10 is not limited to the example in the above embodiment. The number of cylinders 11 may be different from the number in the above embodiment. The internal combustion engine 10 only needs to include a plurality of cylinders 11 and the ignition plug 16 for each cylinder 11.

Technical ideas that are derived from the above embodiment and modifications are described below.

A control device for a hybrid vehicle, the hybrid vehicle including an internal combustion engine and a motor generator as drive sources, the internal combustion engine including a plurality of cylinders and an ignition plug for each of the cylinders, the internal combustion engine, and the motor generator being joined to a drive shaft, the control device being capable of executing: an ignition time calculation process of calculating a target ignition time of the ignition plug; a stop process of stopping combustion control for some cylinders of the cylinders; and a compensation process of controlling the motor generator during the stop process, such that the motor generator compensates a drive power that is lost due to the stop of the combustion control, the control device prohibiting the execution of the stop process when the torque of the internal combustion engine is equal to or lower than a predetermined prescribed torque during deceleration of the hybrid vehicle.

A control device for a hybrid vehicle, the hybrid vehicle including an internal combustion engine and a motor generator as drive sources, the internal combustion engine including a plurality of cylinders, an ignition plug for each of the cylinders, and a filter that traps particulate matter in exhaust gas, the internal combustion engine and the motor generator being joined to a drive shaft, the control device being capable of executing: an ignition time calculation process of calculating a target ignition time of the ignition plug; a stop process of stopping combustion control for some cylinders of the cylinders; a compensation process of controlling the motor generator during the stop process, such that the motor generator compensates a drive power that is lost due to the stop of the combustion control; and a filter regeneration process of removing the particulate matter trapped in the filter, when a condition including a condition that an accumulation amount of the particulate matter in the filter is equal to or larger than a predetermined prescribed accumulation amount is met, the control device prohibiting the execution of the stop process during the execution of the filter regeneration process.

A control device for a hybrid vehicle, the hybrid vehicle including an internal combustion engine and a motor generator as drive sources, the internal combustion engine including a plurality of cylinders and an ignition plug for each of the plurality of cylinders, the internal combustion engine and the motor generator being joined to a drive shaft, the control device being capable of executing: an ignition time calculation process of calculating a target ignition time of the ignition plug; a stop process of stopping combustion control for some cylinders of the cylinders; a compensation process of controlling the motor generator during the stop process, such that the motor generator compensates a drive power that is lost due to the stop of the combustion control; and a knocking determination process of determining whether knocking has occurred in the internal combustion engine, the control device prohibiting the execution of the stop process, when a period during which it is continuously determined that the knocking has occurred in the knocking determination process is equal to or longer than a predetermined prescribed period.

A control device for a hybrid vehicle, the hybrid vehicle including an internal combustion engine and a motor generator as drive sources, the internal combustion engine including a plurality of cylinders and an ignition plug for each of the cylinders, the internal combustion engine and the motor generator being joined to a drive shaft, a speed change gear being joined to the internal combustion engine and having a plurality of gear stages, the control device being capable of executing: an ignition time calculation process of calculating a target ignition time of the ignition plug; a stop process of stopping combustion control for some cylinders of the cylinders; and a compensation process of controlling the motor generator during the stop process, such that the motor generator compensates a drive power that is lost due to the stop of the combustion control, the control device prohibiting the execution of the stop process, when the speed change gear is switching the gear stage.

What is claimed is:

1. A control device for a hybrid vehicle,
the hybrid vehicle including an internal combustion engine and a motor generator as drive sources, the internal combustion engine including a plurality of cylinders and an ignition plug for each of the cylinders, the internal combustion engine and the motor generator being joined to a drive shaft,
the control device being capable of executing:
an ignition time calculation process of calculating a target ignition time of the ignition plug;
a stop process of stopping combustion control for some cylinders of the cylinders; and
a compensation process of controlling the motor generator during the stop process, such that the motor generator compensates a drive power that is lost due to the stop of the combustion control,
the control device prohibiting the execution of the stop process when the target ignition time calculated in the ignition time calculation process is later than a predetermined prescribed time.

2. The control device for the hybrid vehicle according to claim 1, wherein the control device regards the target ignition time as being later than the prescribed time and prohibits the execution of the stop process, when a torque of the internal combustion engine is equal to or lower than a predetermined prescribed torque during deceleration of the hybrid vehicle.

3. The control device for the hybrid vehicle according to claim 1, wherein:
the internal combustion engine includes a filter that traps particulate matter in exhaust gas;
the control device is capable of executing a filter regeneration process of removing the particulate matter trapped in the filter, when a condition including a condition that an accumulation amount of the particulate matter in the filter is equal to or larger than a predetermined prescribed accumulation amount is met; and
the control device regards the target ignition time as being later than the prescribed time and prohibits the execution of the stop process, during the execution of the filter regeneration process.

4. The control device for the hybrid vehicle according to claim 1, wherein:
the control device is capable of executing a knocking determination process of determining whether knocking has occurred in the internal combustion engine; and
the control device regards the target ignition time as being later than the prescribed time and prohibits the execution of the stop process, when a period during which it is continuously determined that the knocking has occurred in the knocking determination process is equal to or longer than a predetermined prescribed period.

5. The control device for the hybrid vehicle according to claim 1, wherein the control device regards the target ignition time as being later than the prescribed time and prohibits the execution of the stop process, when a speed change gear is switching a gear stage, the speed change gear being joined to the internal combustion engine and having a plurality of gear stages.

6. The control device for the hybrid vehicle according to claim 1, wherein the control device continues to prohibit the stop process until a predetermined fixed period elapses after the control device starts to prohibit the execution of the stop process, regardless of the target ignition time.

* * * * *